United States Patent [19]

Cheng et al.

[11] Patent Number: 5,656,320
[45] Date of Patent: Aug. 12, 1997

[54] METHOD FOR MANUFACTURE OF A BRICK CREAM CHEESE PRODUCT

[75] Inventors: Shu Guang Greg Cheng, Arlington Heights; Zohar Mohamed Merchant, Wilmette; Lynn Ann Frye, Rolling Meadows; Gregory Aaron Wiseman, Chicago; Susan Elaine Long, Evanston, all of Ill.; Hermann Eibel, Freising, Germany

[73] Assignee: Kraft Foods, Inc., Northfield, Ill.

[21] Appl. No.: 565,435

[22] Filed: Nov. 30, 1995

Related U.S. Application Data

[63] Continuation-in-part of Ser. No. 354,548, Dec. 13, 1994, abandoned.

[51] Int. Cl.$^6$ ........................................ A23C 19/00
[52] U.S. Cl. ..................... 426/582; 426/524; 426/580
[58] Field of Search ............................. 426/582, 34, 36, 426/580, 524

[56] References Cited

U.S. PATENT DOCUMENTS

| | | | |
|---|---|---|---|
| 2,387,276 | 10/1945 | Link | 426/36 |
| 5,079,024 | 1/1992 | Crane | 426/573 |
| 5,108,773 | 4/1992 | Smith et al. | 426/582 |
| 5,180,604 | 1/1993 | Crane et al. | 426/582 |

FOREIGN PATENT DOCUMENTS

| | | |
|---|---|---|
| 713090 | 8/1968 | Belgium. |
| 526 086 | 3/1993 | European Pat. Off.. |

*Primary Examiner*—Leslie Wong
*Attorney, Agent, or Firm*—Fitch, Even, Tabin & Flannery

[57] ABSTRACT

In the method of the invention, a cream cheese product is provided at a temperature of from about 160° F. to about 170° F. The cream cheese is loaded into rectangular brick type packages. The cream cheese is then cooled to less than about 100° F. in a period of less than about 2 hours. The cream cheese is then further cooled to a temperature of from about 45° F. to about 50° F. in less than about 48 hours.

7 Claims, No Drawings

METHOD FOR MANUFACTURE OF A BRICK CREAM CHEESE PRODUCT

CROSS REFERENCE TO RELATED APPLICATION

This application is a continuation-in-part of application Ser. No. 354,548 filed Dec. 13, 1994, now abandoned.

FIELD OF THE INVENTION

The present invention is directed to a method for manufacture of a brick cream cheese product. Generally, the method is an improvement of previously developed methods for producing cream cheese products wherein the cream cheese product is hot packed into a brick package and is thereafter rapidly cooled.

BACKGROUND OF THE INVENTION

Cream cheese is a soft, mild acid-coagulated uncured cheese made from a mixture of cream and milk. Cream cheese is stored under refrigeration conditions and the body of cream cheese is smooth and butter-like. The texture and body of cream cheese at refrigeration temperatures is such that the cream cheese can be sliced and spread. In making cream cheese, sweet whole milk and/or skim milk and sweet cream are blended in pre-selected proportions to form a cream cheese mix. The cream cheese mix normally has a butterfat content of from about 10% to about 14%. After processing, the finished cream cheese has a butterfat content of from about 33% to about 35% by weight.

The cream cheese mix is pasteurized and homogenized after which it is cooled, usually to a temperature between 62° F. and 92° F. and is then inoculated with a lactic acid culture. Rennet may be used to aid in the coagulation of the mix. The mix is held at the inoculation temperature until it has ripened and a coagulum is formed. The acidity of the coagulum is from about 0.6% to about 0.9% (calculated at percent equivalent lactic acid).

After the desired acidity is obtained, the curd is separated from the whey and is thereafter packaged. One well known process for making cream cheese and separating cream cheese curd from whey includes a mechanical separation of the curd. The process is disclosed in U.S. Pat. No. 2,387,276 to Link. In accordance with the method of the Link patent, after the mix is ripened to form a coagulum, the coagulum is heated to an elevated temperature to break the viscosity of the mix. Thereafter, the heated mix is centrifuged at the elevated temperature to separate the curd from the whey.

There have been many efforts to provide a cream cheese type product which has the texture, smoothness and organoleptic properties of cream cheese, but with reduced levels of fat. With increasing consumer awareness, the focal point is on reducing fat and calorie consumption. Low fat, low calorie foods which look and taste similar to their full fat, higher calorie counterparts are eagerly sought by the consumer. Researchers in the food industry have concentrated on developing food products which are nutritious and palatable, containing substantially reduced levels of high calorie, fat containing ingredients. This is particularly true in the dairy industry where low calorie, low-fat products such as skim milk, yogurt and reduced fat ice cream have been successfully marketed.

The high fat levels in some dairy products, such as cream cheese, which has a fat content of at least about 33%, have been thought to be necessary to maintain a desirable creamy mouthfeel and to avoid the grainy texture associated with prior attempts at producing low fat cream cheese products.

Recently, two methods have been developed for producing non-fat cream cheese, these methods being set forth in U.S. Pat. No. 5,079,024 to Crane and U.S. Pat. No. 5,180,604 to Crane, et al.

In the method of the '024 Crane patent, a source of concentrated skim milk is introduced into a first mixer provided with agitation means. The skim milk is agitated as the skim milk is heated in the first mixer to a first predetermined elevated temperature. An emulsifier salt is added to the skim milk in the first mixer. After reaching the first predetermined elevated temperature, the skim milk is transferred to a second mixer provided with agitation means. A first gum is added to the heated skim milk in the second mixer to provide a thickened skim milk. The thickened skim milk is homogenized in a first homogenizing step. The homogenized skim milk is transferred to a third mixer provided with agitation means. A bulking agent and a second gum are added to the homogenized, thickened skim milk in the third mixer. The homogenized, thickened skim milk is agitated in the third mixer as the skim milk is heated to a second predetermined temperature to provide a non-fat cream cheese precursor. The non-fat cream cheese precursor is homogenized in a second homogenizing step to provide a non-fat cream cheese type product.

In the method of the '604 Crane, et al. patent, a fermented skim milk retentate is introduced into a mixing tank provided with agitation means. The skim milk retentate is agitated and transferred through a recirculating loop as dry cottage cheese curd and an emulsifying salt are added to the mixing tank. Agitation and recirculation are continued for a period of time sufficient to provide a dispersion of the dry cottage cheese curd and emulsifying salt homogeneously throughout the retentate. Heating of the dispersion is then started by injecting steam into the dispersion as it passes through the recirculating loop. While the temperature of the dispersion is within the range of from about 70° F. to about 150° F., non-fat dry milk is added to the dispersion. Agitation and heating is continued until the dispersion temperature is within the range of from about 140° F. to about 165° F. Xanthan gum, as the first gum of a stabilizing system, is then added to the mixing tank. Agitation and heating is continued until the dispersion temperature is in the range of from about 165° F. to about 190° F. The steam is shut off and salt, sugar and carrageenan, as the second gum of a stabilizer system, are added to the mixing tank. Agitation is continued for a period of from about 1 to about 4 minutes to provide a non-fat cream cheese mix. The non-fat cream cheese mix is then homogenized to provide a non-fat cream cheese product.

While the methods of the two above-described patents have been found to produce a very acceptable tub type cream cheese product, there have been problems connected with producing a brick type cream cheese product. For the tub type non-fat cream cheese product, the tubs are hot packed with the non-fat cream cheese product, loaded onto pallets and placed in a cool room, maintained at a temperature of about 45° F. Cooling of the product from the temperature at which it is hot packed to a temperature of 45° F. can take as long as four days.

Brick cream cheese is conventionally made from full-fat cream cheese by using a chill roll for cooling the full-fat cream cheese. The hot cream cheese from the cream cheese make process is poured as a thin layer on the chill roll which is maintained at refrigeration temperatures. The cream cheese is doctored from the chill roll and is passed through an auger where it is subjected to shear. The product is then packaged into bricks. In another method for making full-fat cream cheese, the cream cheese is hot packed into brick packages. The brick packages are stacked onto a pallet and the pallets are placed into a cold room maintained at a temperature of about 45° F. The temperature of the cream cheese is gradually reduced to about 45° F. over a period of about 5 days.

Attempts have been made to use the chill roll method to make a brick cream cheese from the non-fat cream cheese produced by the methods of the '024 Crane patent and the '604 Crane, et al. patent. The absence of fat in the non-fat cream cheese products of the '024 Crane patent and '604 Crane, et al. patents prevents the product from blending well in the auger. The shear in the auger makes the product soft, airy and easily deformed when packaged into bricks. The pallet method of cooling also produces non-fat brick cream cheese with inferior body and textural properties.

Accordingly, it is a principal object of the present invention to produce an improved brick cream cheese product.

Another object of the present invention is to provide an improvement in the '024 Crane patent and '604 Crane, et al. patent to permit the methods of these patents to be used to produce a brick cream cheese product.

SUMMARY OF THE INVENTION

In the method of the invention, a cream cheese product is provided at a temperature of from about 160° F. to about 170° F. The cream cheese is loaded into rectangular brick type packages. The cream cheese is then cooled to less than about 100° F. in a period of less than about 2 hours. The cream cheese is then further cooled to a temperature of from about 45° F. to about 50° F. in less than about 48 hours.

DETAILED DESCRIPTION OF THE INVENTION

In accordance with the present invention, a hot fill and fast cooling are used to produce a brick cream cheese product. The method of the invention produces brick of cream cheese products having brick integrity and the performance associated with full-fat brick cheese, such as spreading consistency and ingredient performance in baking and cooking applications.

In accordance with the method, the hot cream cheese at a temperature of from about 160° F. to about 170° F. is loaded into brick packages. Brick packages are rectangular packages usually having dimensions of 4.88 inches long by 2.313 inches wide by 1.219 inches high. The cream cheese is then cooled from the initial temperature of from about 160° F. to about 190° F. to a temperature in the range of from between 45° F. to about 100° F. in a period of less than about 2 hours. If the cream cheese product has a temperature above 45° F. after the two hour cooling period, the temperature is reduced to 45° F. by placing the brick packages on a pallet and inserting the pallet into a cold room having a temperature of about 45° F. Further cooling of the cream cheese product to a temperature of from about 45° F. to about 50° F. takes place in a period of less than about 2 days.

In one embodiment of the invention, the non-fat cream cheese is cooled from the initial temperature of from about 160° F. to about 190° F. by transferring non-fat cream cheese brick packages through a cryogenic spiral freezer. The non-fat cream cheese is cooled from the initial temperature to a temperature of from about 45° F. to about 50° F. in a period of from about 0.75 hours to about 1.5 hours. A typical cryogenic spiral freezer is described in U.S. Pat. No. 5,020,330 to Rhoades. In another embodiment of the invention, the non-fat cream cheese is cooled to a temperature of less than about 100° F. in less than about 2 hours by use of forced air cooling. The non-fat cream cheese is then further cooled by placing the cream cheese brick packages on a pallet which is placed in the cold room where the temperature is reduced to about 45° F. to about 50° F. is less than 48 hours.

In one embodiment of the invention, the hot packed packages are transferred through a spiral cryogenic cooling tunnel having a first stage cooling temperature of from about −3° F. to about 3° F. and a second stage cooling temperature of from about 26° F. to about 30° F. where the non-fat cream cheese is cooled to a temperature of from about 45° F. to about 50° F. in a period of from about 0.75 hours to about 1.5 hours.

It has also been determined that the cooling method of the present invention can be used with full-fat cream cheese to provide a full-fat brick cream cheese with improved properties. Full-fat cream cheese cooled by the method of the present invention has improved penetration properties and has a lessened tendency for syneresis of whey on the surface of the cream cheese during storage.

The following examples further illustrate various features of the invention but are intended to in no way limit the scope of the invention as set forth in the appended claims.

EXAMPLE 1

A non-fat cream cheese product is prepared in accordance with the method of the invention containing the following ingredients at the indicated levels:

TABLE 1

| Ingredient | Percentage As Is | Percent Solids |
| --- | --- | --- |
| UF concentrated skim milk | 48.5 | 11.9 |
| Dry curd cottage cheese | 32.3 | 7.0 |
| Water/Steam | 13.2 | 0 |
| Non-fat dry milk | 2.7 | 2.6 |
| Sodium Tripolyphosphate | 0.9 | 0.9 |
| Salt | 0.55 | 0.5 |
| Sugar | 0.82 | 0.8 |
| Titanium Dioxide | 0.46 | 0.5 |
| Xanthan Gum | 0.27 | 0.3 |
| Kappa Carrageenan (GP911) | 0.9 | 0.09 |
| Potassium Sorbate | 0.06 | 0.06 |
| Calcium Propionate | 0.05 | 0.05 |
| Starter Culture | 0.025 | 0 |
| Vitamin A Palmitate | 0.016 | 0 |
| Oleoresin Paprika | 0.001 | 0 |
| Total Solids | | 24.70 |

The skim milk retentate was retained in a holding tank at a temperature of 72° F. The retentate was inoculated with a culture of S. lactis and was fermented for a time of 16 hours until a pH of 5.0 was reached. 969.5 pounds of the fermented skim milk retentate were then transferred to a Breddo mixer having a capacity of 300 gallons. The mixer was turned on and 646.7 pounds of dry curd cottage cheese at a temperature of 40° F. was added to the mixer. 18.24 pounds of tripolyphosphate was added to the mixer and agitation and recirculation through a recirculation loop was continued for three minutes. At this time, steam at a pressure of 45 psig was injected into the recirculating loop. After reaching a temperature of 145° F., 54.76 pounds of non-fat dry milk was added. After reaching a temperature of 160° F., 5.48 pounds of xanthan gum was added. After reaching a temperature of 187° F., steam injection was stopped and 10.96 pounds of salt, 16.42 pounds of sugar, 9.14 pounds of titanium dioxide, 1.16 pounds of potassium sorbate, 0.92 pounds of calcium propionate, 1.8 pounds of carrageenan, 0.32 pounds of Vitamin A palmitate and 0.02 pounds of oleoresin paprika was added. Agitation of the mixture was continued for a total of 3 minutes.

The non-fat cream cheese mix resulting from the sequence of heating and addition steps described hereinabove, was then homogenized in a Gaulin homogenizer at a pressure of 5,000 psig.

The hot non-fat cream cheese product was packaged into brick packages while at a temperature of about 170° F. The non-fat cream cheese product was cooled in a cryogenic freezer from a temperature of 170° F. to a temperature of 45° F. in a period of one hour. Other samples of the non-fat cream cheese product were cooled from 170° F. to 100° F. within two hours using forced air cooling. These samples were placed on a pallet which was transferred to a cool room, which was at a temperature of 45° F. These samples were cooled from 100° F. to about 48° F. over a period of 44 hours.

Both methods of cooling resulted in a non-fat cream cheese product with acceptable texture. Other samples of the hot packed non-fat cream cheese product which were loaded directly onto a pallet and placed in the cool room, where they were cooled from 170° F. to 48° F. over a period of 4 days resulted in a product with inferior texture exhibiting syneresis and off-flavor.

EXAMPLE 2

Skim milk is subjected to ultrafiltration treatment to provide a skim milk retentate having 26% solids. The skim milk retentate comprises 4.2% lactose, 19% protein, 2.05% ash, 0.24% fat and 0.12% salt. The skim milk retentate is subjected to high temperature, short time heat treatment to pasteurize the retentate. The retentate is then introduced into a fermentation tank and an *S. lactis* culture is added thereto along with 0.1% salt. The skim milk retentate (4000 gallons) is subjected to fermentation at a temperature of 72° F. for 16 hours. 1900 pounds of the fermented skim milk retentate is then introduced into a first mixer. The first mixer is a Groen kettle. Dry curd cottage cheese, at a level of 2086 pounds is added to the first mixer and 50 pounds of sodium citrate are also added. The agitating means of the first mixer is turned on and the mixture is pumped through the first recirculating loop. Steam injection is commenced and the mixture of fermented retentate cottage cheese curd and sodium citrate are heated to a temperature of 145° F. Such heating takes place over a period of 15 to 30 minutes.

After being heated to a temperature of 145° F., the mixture is transferred to a second mixer, which is a Breddo mixer, and 27.5 pounds of xanthan gum are introduced into the heated mixture while the mixture is being agitated. The mixture is retained under agitating conditions in the Breddo mixer for a period of 5 minutes after addition of the xanthan gum. The mixture is then transferred to a surge tank and is then homogenized at a pressure of 2500 psig in a Gaulin homogenizer.

The mixture is transferred to a third mixer, which is a Pfaudler mixer. Corn syrup solids having a DE of 24 at a level of 7.4%, salt at a level of 1.1%, sugar at a level of 0.6%, artificial color at a level of 0.001%, carrageenan at a level of 0.15%, guar gum at a level of 0.1%, sorbic acid at a level of 0.1%, Vitamin A and oleoresin paprika are added in the third mixer. All percentages used herein are by weight, based on the weight of the finished product. The mixture has a pH of 5.0. The mixture is agitated and recirculated in the third mixer as it is being heated to a temperature of 170° F. The mixture from the third mixer 37 is then homogenized in a Gaulin homogenizer at a pressure of 5,000 psig. The homogenized mixture is then passed through a Versator™ deaerator manufactured by Cornell Machine Co., maintained at a pressure of −26 in. Hg. The hot non-fat cream cheese product was packaged into brick packages while at a temperature of about 170° F. The non-fat cream cheese product was cooled in a spiral type cryogenic freezer from a temperature of 170° F. to a temperature of 45° F. in a period of one hour. Other samples of the non-fat cream cheese product were cooled to 100° F. within two hours using forced air cooling. These samples were placed on a pallet which was transferred to a cool room, which was at a temperature of 45° F. These samples were cooled from 100° F. to about 48° F. over a period of 44 hours.

Both methods of cooling resulted in a non-fat cream cheese product with acceptable texture. Other samples of the hot packed non-fat cream cheese product which were loaded directly onto a pallet and placed in the cool room, where they were cooled from 170° F. to 48° F. over a period of 4 days resulted in a product with inferior texture exhibiting syneresis and off-flavor.

EXAMPLE 3

A full-fat cream cheese was prepared. A cream cheese mix having 12% butterfat was prepared by blending whole milk with cream. The cream cheese mix was pasteurized and homogenized after which the mix was cooled to 80° F. The cream cheese mix was inoculated with a lactic acid culture and fermented for one hour. Rennet was then added to aid in coagulation of the mix. After an acidity of 0.75% (equivalent lactic acid) was obtained, the coagulum was heated to a temperature of 170° F. to break the viscosity of the mix. The heated mix was then centrifuged to separate the cream cheese from the whey. The cream cheese, at a temperature of 160° F., was hot packed into brick packages.

The brick type cream cheese product was cooled in a spiral type cryogenic freezer from a temperature of 170° F. to a temperature of 45° F. in a period of one hour. Other samples of the cream cheese product were cooled to 100° F. within two hours using forced air cooling. These samples were placed on a pallet which was transferred to a cool room, which was at a temperature of 45° F. These samples were cooled from 100° F. to about 48° F. over a period of 44 hours.

Both methods of cooling resulted in a cream cheese product with improved penetration properties and which exhibited less syneresis as compared to prior art methods for producing full fat cream cheese.

What is claimed is:

1. In a method for making a brick type cream cheese product, the improvement comprising hot packing a cream cheese product into brick packages and first cooling said cream cheese product from a first temperature of from about 160° F. to about 180° F. to a second temperature of from about 45° F. to about 100° F. in less than about 2 hours and, if at the end of the 2 hours of the first cooling the second temperature of said cream cheese product remains greater than about 50° F., then further cooling said cream cheese product to a third temperature of from about 45° F. to about 50° F in less than about 48 hours.

2. A method in accordance with claim 1 wherein said cream cheese is a non-fat cream cheese.

3. A method in accordance with claim 1 wherein said cream cheese is a full-fat cream cheese.

4. A method in accordance with claim 1 wherein said cream cheese product is first cooled from said first temperature of from about 160° F. to about 180° F. to said second temperature of from about 45° F. to about 50° F. in a period of from about 0.75 hours to about 1.5 hours.

5. A method in accordance with claim 2 wherein said first cooling takes place in a cryogenic cooler.

6. A method in accordance with claim 1 wherein said cream cheese product is first cooled from said first temperature of from about 160° F. to about 180° F. to said second temperature of from about 90° F. to about 100° F. in a period of less than about 2 hours and is then further cooled to said third temperature of from about 45° F. to about 50° F. in less than about 48 hours total cooling time.

7. A method in accordance with claim 4 wherein said first cooling takes place utilizing forced air cooling and said further cooling takes place in a cold room maintained at a temperature of about 45° F.

* * * * *